(No Model.) 2 Sheets—Sheet 2.
O. LEUNER.
INSTRUMENT FOR MEASURING TEMPORARY AND PERMANENT STRESSES IN IRON BRIDGES.
No. 578,459. Patented Mar. 9, 1897.
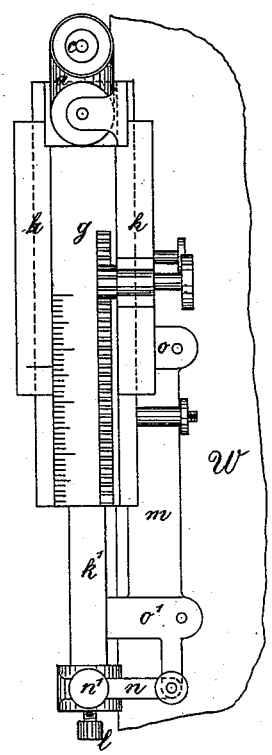
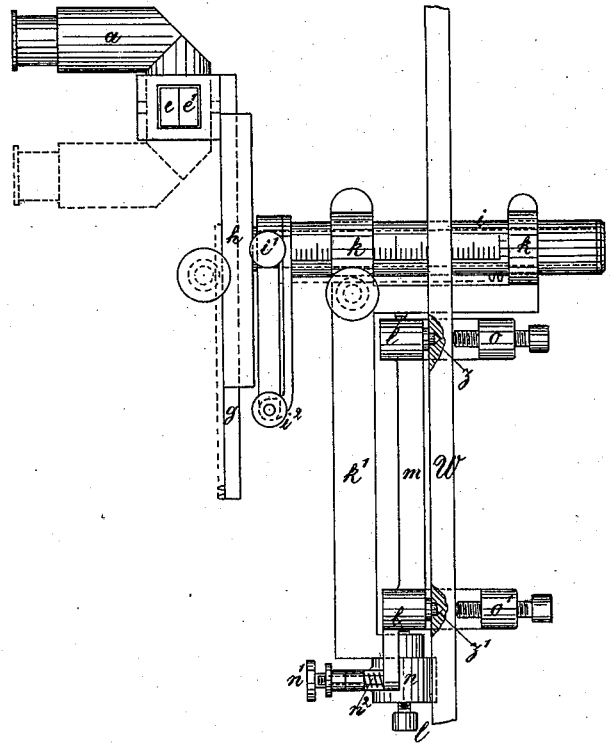
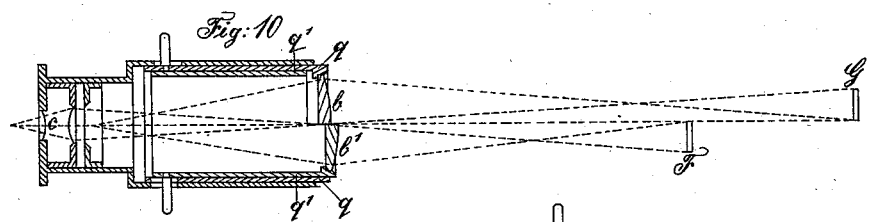
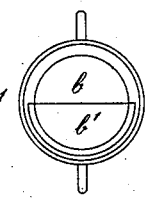
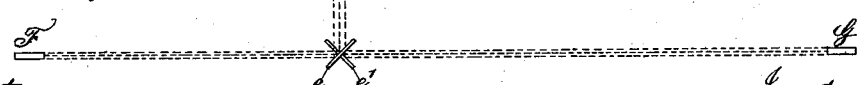
Witnesses:
Jos. B. Connolly
Theo. T. Snell
Inventor,
Oskar Leuner,
by Arthur N. Brown
his Attorney

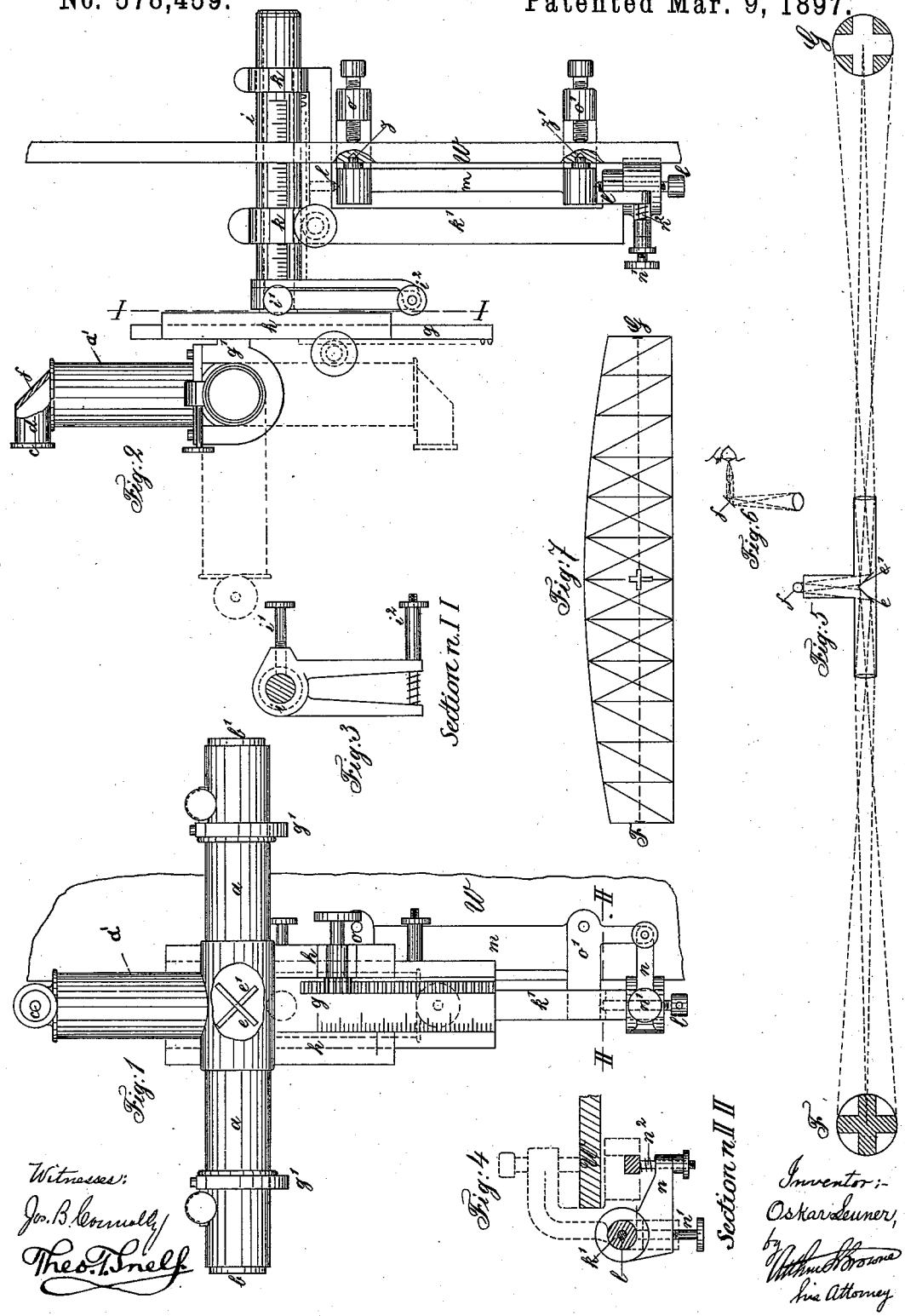

UNITED STATES PATENT OFFICE.

OSKAR LEUNER, OF DRESDEN, GERMANY.

INSTRUMENT FOR MEASURING TEMPORARY AND PERMANENT STRESSES IN IRON BRIDGES.

SPECIFICATION forming part of Letters Patent No. 578,459, dated March 9, 1897.

Application filed March 30, 1896. Serial No. 585,388. (No model.) Patented in France January 6, 1896, No. 250,236.

*To all whom it may concern:*

Be it known that I, OSKAR LEUNER, a subject of the King of Saxony, residing at Dresden, in the Kingdom of Saxony, German Empire, have invented a new and useful Instrument for Measuring the Temporary and Permanent Flexure in Iron Bridges and Similar Structures, (for which French Letters Patent No. 250,236, dated January 6, 1896, have been granted to me,) of which the following is a specification.

This invention relates to an instrument whereby the depression as well as the lateral displacements taking place in iron bridges and similar structures may be simultaneously and exactly measured. This instrument and the method of measuring such alterations by its use are based on the idea that a straight line is set off on each bearing-wall of the bridge by means of fixed marks at each end. Through this line a vertical and a horizontal plane are assumed to pass. From a suitable part of the members of each girder or from suitable points therein the perpendicular distance from both these planes is measured both before and after the bridge is equipped, loaded, or used, as the case may be. The difference in measurement before and after indicate the amount of vertical and lateral displacement, respectively, that has taken place in the bridge between the first and second measurements.

The instrument shown in the accompanying drawings consists of an optical and a mechanical part. The optical part serves for sighting the straight line indicated by the marks hereinbefore referred to, which line determines the planes of observation. The mechanical part is to measure the position relatively to the planes of observation of the structural parts of the bridge to be observed.

The present improvements are illustrated in the accompanying drawings, wherein—

Figure 1 is an elevation of the improved instrument. Fig. 2 is a side view thereof. Figs. 3 and 4 are detail views. Figs. 5 and 6 are diagrams showing the action of the optical portion of the instrument. Fig. 7 is a diagram illustrating the manner in which the instrument is to be used. Fig. 8 is an elevation, and Fig. 9 a side view, of a modified form of the instrument. Fig. 10 is a sectional view, and Fig. 11 an end view, of a modified form of the optical portion of the instrument. Fig. 12 is a diagram illustrating the action of the optical portion of the modified instrument shown in Figs. 8 and 9.

The optical portion of the apparatus is arranged in a tube $a$, and consists of, first, the objectives $b$ and $b'$ at the ends of the tube $a$, these being adjustable in the axial line of the tube by means of rack-and-pinion gear of the usual construction; second, the eyepiece $c$, mounted in the tubular piece $d$ at the center of the tube $a$, the tubular piece $d$ being capable of rotating on its axis, and the rotation of the tubular piece $d$ can be secured by any of the constructions usually employed for this purpose with eyepieces, as, for example, by providing the piece $d$ with a tubular sleeve which slips telescopically and turns frictionally within the standard $a'$, which rises perpendicularly from the tube $a$; third, the crossed mirrors or prisms $e\ e'$ facing the tubular piece $d$ in the tube $a$; fourth, a mirror $f$, mounted obliquely in the tubular piece $d$, so as to face the eyepiece $c$.

The whole assumes the form of a double telescope in which the rays entering by the objectives $b$ and $b'$ are reflected to the eyepiece $c$ by the mirrors $e\ e'$ and $f$, as indicated in the diagrams, Figs. 5 and 6, so that the objects in the two fields of vision of the telescope become visible to the eye simultaneously and coincide to form a single image.

The mechanical part of the instrument is of the following construction: On a plate $g$ are provided two arms $g'$, which serve as bearings for the tube $a$. Vertically this plate $g$ moves in a guide $h$, in which it is adjustable by rack-and-pinion gear. A graduated scale on the plate $g$ in connection with an index-mark on the guide allows the extent of relative motion to be measured. At the rear the guide $h$ has a cylindrical pivot turning in a sleeve $i$, in which it may be fixed by a set-screw $i'$. (See Fig. 3.) When the screw $i'$ is loosened, the pivot may be micrometrically adjusted (at the level $i$) by the screw $i^2$. This rotation of the pivot in $i$ permits adjustment of the tube $a$ in the vertical plane.

The sleeve $i$ may be adjusted in the carrier $k$ by rack-and-pinion gear moving the same in its axial line. The sleeve has a graduated scale, so that the extent of adjustment may be ascertained. The piece $k'$, which supports the carrier $k$, is attached to the piece $m$ by two screws $l\ l$, on which it rotates. On $k'$ is formed a stud surrounding the lower screw $l$, and this stud carries an arm $n$ capable of rotating thereon. A clamping-screw $n'$ serves to fix the arm $n$ on the stud, so that $k'$ is retained in position, as will appear from Fig. 4. The end of the arm $n$ engages with the screw $n^2$ on the part $m$. By this screw the piece $k'$ may be rotated on the center screws $l$ for the purposes of micrometric adjustment, and this effects horizontal adjustment of the tube $a$.

Two screw-clamps $o$ and $o'$ on the part $m$ serve to fix the instrument on the structural part under observation. In order to insure that the instrument may in subsequent observations be again fixed at the same point of a given structural part at which it was fixed on the first occasion, pivots $z$ and $z'$ are provided in the part marked $m$ in the drawings.

By means of the instrument just described the method hereinbefore indicated is practiced as follows: Suppose that a bridge is to be observed from the time of its completion to the time when it is equipped, which bridge has girders of the shape shown in Fig. 7. Then a straight line is set out along each girder by fixing marks F and G at its ends. This line would form the axis of an imaginary vertical and horizontal plane. These marks should be of equal size, but contrasting in the color of their surfaces—for instance, as indicated in Fig. 5. The instrument is next fixed on one of the structural parts selected for observation—for instance, as shown in Fig. 7, in the vertical center line and so that the axis of the telescope is approximately in the straight line connecting F and G. By means of the mechanisms provided for that purpose, as hereinabove specified, the telescope is then so adjusted that its axis exactly coincides with the line F G. This is the case when the images of the two marks F and G appear as a single image when seen through the eyepiece $c$.

To correct inaccuracies of the instrument, the following precautions may be taken: In sighting the line F G the tubular piece $d$ is first placed upright, as shown in full lines in the drawings. Then turn the tube $a$ on its bearings $g'$ and the eyepiece $c$ by its mount until the tubular piece $d$ is directed downward, as shown in dotted lines. Then if the images do not coincide, readjust by means of the rack and pinion till the images again coincide and note the arithmetical mean of the two readings on the vertical scale. This indicates the position (at the time being) of the structural part under observation with reference to the horizontal plane through which line F G passes.

For the purpose of determining the position of the same part relatively to the vertical plane of observation the telescope is so adjusted that the tubular piece is horizontal, as also shown by dotted lines in Fig. 2 of the drawings. In reading the indication on the horizontal scale the mean of the difference in the optical axis, as ascertained from the vertical readings, has to be taken into account. In like manner observations are taken for all the structural parts that have to be considered with reference to the girder, say.

After equipment, or after the bridge has been loaded, or after it has been in use for some time the process is repeated for the several points of observation. If the readings obtained on the two scales of the instrument differ from the previous ones, the differences indicate the alteration in configuration or position of the bridge that has taken place since the last reading. Thus it may be rapidly ascertained whether any vertical deflection of the structural parts has taken place, and, if so, to what extent, while at the same time lateral flexure is observed and measured.

In Figs. 8 to 12 a modification in the optical part of the apparatus is shown. In this modification the objectives $b\ b'$ with the eyepiece $c$ are combined to form a single telescope, and the prism $e\ e'$, as well as the mirror $f$, are arranged in front of it. (See also Fig. 12.) The following novel arrangement is adopted in this form: In order to provide for cases where the objects to be sighted, and consequently the marks F and G, are not at the same distance from the telescope, and to admit of independent adjustment of the objectives, each of the latter $b$ and $b'$ consists of only half a lens, each mounted in a separate piece of tube $q$ and $q'$, respectively. (See Fig. 10.) Each piece of tube is capable of axial adjustment either by rack and pinion or otherwise, each objective being thus capable of independent adjustment. To the eye looking through the eyepiece the objects appear vertically one above the other. To allow for this, rod-like marks F and G will be used for this form of instrument instead of round ones, as with the former. The mechanical part of the instrument is the same in this form as in the former, and the manipulation consequently does not differ.

Having fully described my invention, what I claim, and desire to secure by Letters Patent of the United States, is—

1. The optical instrument having tube $a$, with objectives $b$, $b'$, at its opposite ends, and oppositely-arranged reflectors $e$, $e'$, at its middle between said objectives, and having the eyepiece-tube $d$, mounted on the middle of said tube $a$, so as to rotate on its own axis, said tube $d$, having eyepiece $c$, and mirror $f$, whereby the images within the range of both objectives $b$, $b'$, are simultaneously observed at the eyepiece $c$, in combination with the frame $m$, adapted to be fastened to a fixed object, the carrier $k$, $k'$, journaled to swing on said frame $m$, means for micrometrically adjusting said carrier $k$, $k'$, on the frame $m$, and for clamping it thereto, sleeve $i$, longitudinally adjustable on carrier $k$, $k'$, in a direction perpendicular to the axis on which the said carrier swings on the frame $m$, guide $h$, having pivot-stud entering said sleeve $i$, whereby said guide is capable of swinging in a plane at right angles to that in which said carrier $k$, $k'$, swings, means for micrometrically adjusting said guide $h$, and for clamping it in place on the sleeve $i$, a sliding plate $g$, sliding on the guide $h$, in a direction perpendicular to that in which the said sleeve $i$, slides on the carrier $k$, $k'$, said tube $a$, of the optical instrument being mounted to turn axially on said sliding plate $g$, whereby said optical instrument is capable of universal adjustment, and suitable scales to enable the adjustment to be read and noted, substantially as set forth.

2. The optical instrument for simultaneously viewing objects located in different directions, having, in combination, the tube $a$, with objectives $b$, $b'$, at its opposite ends, and oppositely-arranged reflectors $e$, $e'$, at its middle between said objectives, and having the eyepiece-tube $d$, mounted on the middle of said tube $a$, and having eyepiece $c$, and mirror $f$, whereby the images of objects located in different directions and within the range of both objectives $b$, $b'$, are simultaneously observed at the eyepiece, substantially as set forth.

3. An optical instrument for simultaneously viewing objects located in different directions, having, in combination, an eyepiece, two oppositely-arranged reflectors adapted to reflect objects located in different directions from the instrument, and a single mirror intermediate between said double reflectors and said eyepiece for directing the images of said differently-located objects from both reflectors to said eyepiece, substantially as set forth.

4. An optical instrument having, in combination, an eyepiece, and oppositely-arranged reflectors for directing to said eyepiece the images of objects located in different directions, substantially as set forth.

5. An optical instrument for simultaneously viewing objects located in different directions, having, in combination, an eyepiece, and means for directing to said eyepiece in juxtaposition with each other the images of two objects which are located in different directions from the instrument, substantially as set forth.

6. The support or mount for an optical instrument, comprising in combination, means for permitting the longitudinal adjustment of said instrument in two directions perpendicular to each other, and for permitting the axial adjustment of said instrument on three axes, each of said axes being perpendicular to the other two, substantially as set forth.

In testimony whereof I have signed this specification in the presence of two subscribing witnesses.

OSKAR LEUNER.

Witnesses:
WILHELM WUNDER,
AV. KIETER.